No. 649,484. Patented May 15, 1900.
P. SCHLACHTER & W. REIFERSCHEID.
INSECT TRAP.
(Application filed Sept. 12, 1899.)

(No Model.)

Witnesses:
C. H. Raeder
Thomas E. Turpin

Inventors:
P. Schlachter and
W. Reiferscheid
By James J. Sheehy
Attorney

UNITED STATES PATENT OFFICE.

PHILIPP SCHLACHTER AND WILLIAM REIFERSCHEID, OF STREATOR, ILLINOIS; SAID PHILIPP SCHLACHTER, SR., ASSIGNOR TO PHILLIP SCHLACHTER, JR., OF SAME PLACE.

INSECT-TRAP.

SPECIFICATION forming part of Letters Patent No. 649,484, dated May 15, 1900.

Application filed September 12, 1899. Serial No. 730,260. (No model.)

*To all whom it may concern:*

Be it known that we, PHILIPP SCHLACHTER and WILLIAM REIFERSCHEID, citizens of the United States, residing at Streator, in the county of La Salle and State of Illinois, have invented new and useful Improvements in Insect-Traps, of which the following is a specification.

Our invention relates to that class of insect-traps which are designed more especially for catching roaches; and it consists in the peculiar and advantageous construction hereinafter described, and particularly pointed out in the claim appended.

Figure 1:
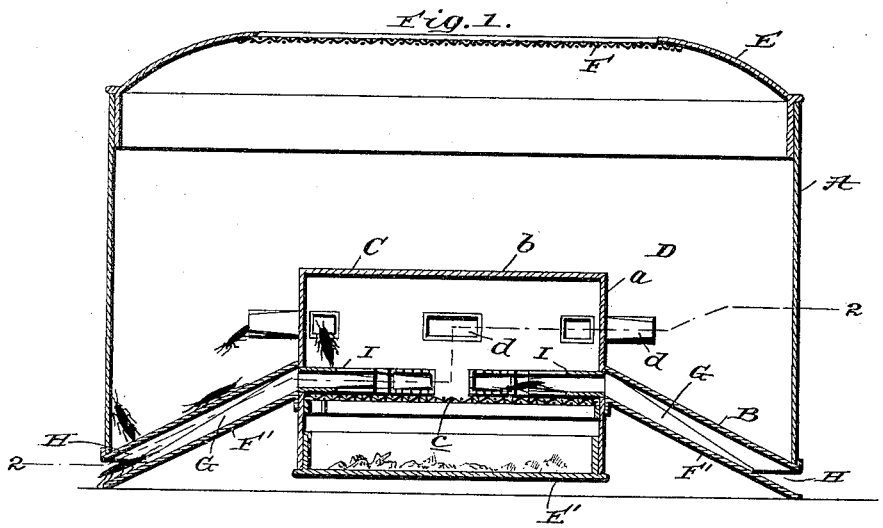
Figure 2:
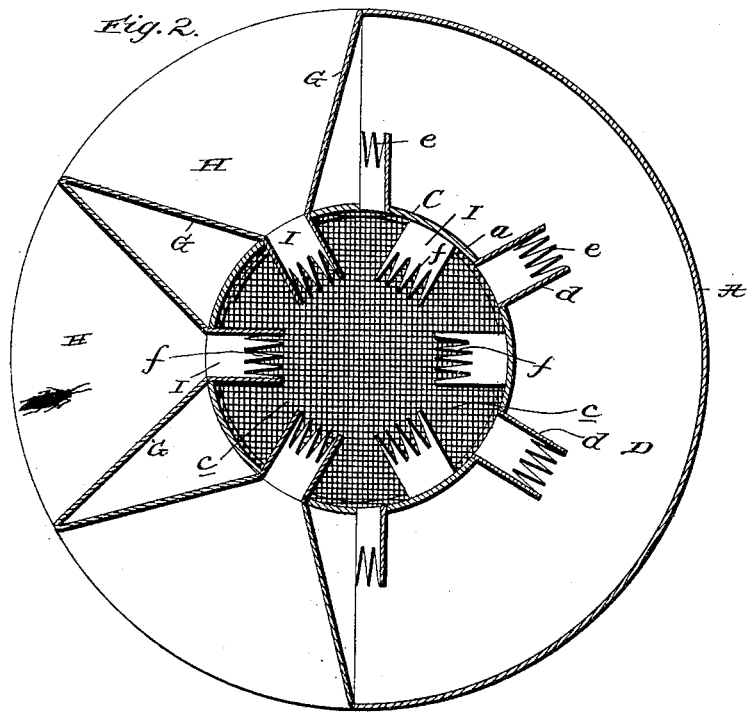

In the accompanying drawings, Figure 1 is a diametrical section of our improved trap in its operative position. Fig. 2 is a section taken on the line 2 2 of Fig. 1.

In said drawings similar letters designate corresponding parts in both views.

The outer vertical wall A of the trap serves, in conjunction with an annular inclined wall B, extending upwardly and inwardly from its lower edge, and a central compartment C, to form a receptacle D, into which the roaches are free to enter, but which they are effectually prevented from leaving, as will be presently described. This receptacle D is closed at its top by a removable cover E, provided with a diaphragm F, of wire-gauze or other material, calculated to admit light to the receptacle.

The central compartment C is formed by a vertical wall $a$, which is preferably circular and depends below the inner edge of wall B, a top wall $b$, and a foraminated bottom wall or diaphragm $c$. It is connected with the interior of receptacle D by conduits $d$, which extend laterally from its side wall $a$ in about the horizontal plane illustrated and have the outer ends of their upper and lower walls toothed, as indicated by $e$.

E' is a bait cup or receptacle which is normally held by frictional contact in the lower end of the wall $a$ of compartment C, but may be readily removed therefrom when it is necessary to replenish the supply of bait.

F' is an annular inclined wall which is arranged below and parallel with the wall B and has its inner edge connected to the wall $a$ of compartment C and its outer edge arranged to bear on the base or support on which the trap is placed. The space between the walls B F' is divided by interposed partitions G into passages H, which by reason of the disposition of the partitions are gradually diminished in width from their outer to their inner ends. At their inner and contracted ends the said passages H merge into horizontal conduits I, which extend laterally inward from the wall $a$ of compartment C into said compartment and have their upper and lower walls toothed at their inner ends, as indicated by $f$.

In practice roaches and similar insects smell the bait in the cup E' and in seeking the same pass up the inclined passages H and through the conduits I into the central compartment C. They are prevented from passing from compartment C back through the conduits I by the sharp teeth at the inner ends of the latter, but are free to pass through the conduits $d$ into the receptacle D. This they generally do, being attracted by the light in the receptacle D, and when they are once in said receptacle they are effectually prevented from leaving by the sharp teeth of the conduits $d$.

When it is desired to remove the roaches and other insects from the trap, the same may be readily accomplished by removing the cover E and dumping the receptacle D.

In practice we prefer to make all of the parts of the trap, excepting the diaphragms F and $c$, of tin, but do not desire to be understood as confining ourselves to such material, as any other material suitable to the purpose may be employed.

It will be appreciated from the foregoing that while simple, compact, and inexpensive in construction our improved trap is highly efficient in accomplishing the purpose for which it is designed.

Having described our invention, what we claim, and desire to secure by Letters Patent, is—

A roach-trap comprising a central compartment provided with a foraminated bottom and having its side wall extended below said bottom, a removable bait-cup arranged at the lower end of the central compartment and below the bottom thereof, a receptacle surrounding the central compartment and having the annular, upwardly and inwardly inclined bottom wall, a removable cover for said receptacle, an annular inclined wall arranged below the bottom wall of the receptacle, partitions dividing the space between said annular walls into passages, conduits communicating with said passages and extending inwardly into the central compartment and provided with means for preventing back passage of roaches, and conduits extending from the central compartment, outwardly into the receptacle and provided with means for preventing back passage of roaches, substantially as specified.

In testimony whereof we have hereunto set our hands in presence of two subscribing witnesses.

PHILIPP SCHLACHTER.
   WILLIAM REIFERSCHEID.

Witnesses:
 F. D. MERRITT,
 H. J. HOWLAND.